United States Patent [19]
Katzman et al.

[11] Patent Number: 4,760,550
[45] Date of Patent: Jul. 26, 1988

[54] SAVING CYCLES IN FLOATING POINT DIVISION

[75] Inventors: Solomon J. Katzman, Tokyo, Japan; Stephen J. Rawlinson, Sunnyvale, Calif.

[73] Assignee: Amdahl Corporation, Sunnyvale, Calif.

[21] Appl. No.: 907,060

[22] Filed: Sep. 11, 1986

[51] Int. Cl.⁴ .............................................. G06F 7/38
[52] U.S. Cl. ...................................... 364/748; 364/761
[58] Field of Search ................ 364/748, 761, 764, 715

[56] References Cited

U.S. PATENT DOCUMENTS 4,413,326 11/1983 Wilson et al. ........................ 364/748

FOREIGN PATENT DOCUMENTS 60637  4/1984 European Pat. Off. ............ 364/748
145465 6/1985 European Pat. Off. ............ 364/748

Primary Examiner—Gary V. Harkcom
Assistant Examiner—Tan V. Mai
Attorney, Agent, or Firm—Fliesler, Dubb, Meyer & Lovejoy

[57] ABSTRACT

In dividing a pair of binary coded, hexidecimal floating point numbers, leading zero quotient bits are eliminated by comparing the magnitudes of the most significant digits of the fractional parts of the dividend and divisor after the dividend and divisor have been normalized.

10 Claims, 4 Drawing Sheets

PRIOR ART

FIG. — 2

SAVING CYCLES IN FLOATING POINT DIVISION

BACKGROUND OF THE INVENTION

1. Field of the Invention

The present invention relates to a method and apparatus for performing floating point division in general and in particular to a method and apparatus for saving machine cycles that would otherwise generate leading zero quotient bits during a floating point division operation.

2. Description of Prior Art

A typical floating point number such as used in the IBM 370 architecture comprises a sign bit, 7 characteristic or exponent bits and either 6 or 14 mantissa or fraction hexadecimal digits. Six fraction digits are used in short division and 14 fraction digits are used in long division when greater accuracy is desired. When binary coded, a hexadecimal digit comprises 4 bits. For example, a hexadecimal 96, or $96_{16}$, is represented in binary as 1001 0110.

In typical prior known floating point division operations in which a dividend N was divided by a divisor D in a binary arithmetic logic unit, the fractions of the dividend and the divisor N and D, FRAC(N) and FRAC(D), respectively, were initially normalized to eliminate zeros in the leading most significant digit positions. For example, a hexidecimal dividend $N = 16^3 \times 0.00321$ after being normalized was represented as $16^1 \times 0.321$. Note that for each leading zero that was eliminated, the exponent of the radix 16 was adjusted accordingly.

After FRAC(N) and FRAC(D) were normalized, FRAC(N) was further adjusted so that

FRAC(N) < FRAF(D), any accompanying exponent was adjusted accordingly and a bit trigger register was set or reset depending on the nature of the adjustment to FRAC(N), as further described below. The purpose of making sure that FRAC(N) was less than FRAC(D) at the outset of the division operation was to insure that all digits in FRAC(N) and FRAC(D) would participate in the division operation.

Three examples will illustrate the adjustments to FRAC(N) which were heretofore made to comply with the requirement that

FRAC(N) < FRAC(D)

EXAMPLE 1

$N = 16^2 \times 0.F0000$ $D = 16^1 \times 0.18000$

Since FRAC(N) $\geq$ 4 $\times$ FRAC(D), it was necessary to reduce FRAC(N) by at least a factor of 16 and this was done by shifting FRAC(N) one digit (4 bits) to the right and adjusting the exponent accordingly such that $N = 16^3 \times 0.0F0000$ In this example, because FRAC(N) was shifted 4 bits to the right, the bit trigger was reset to zero. Thereafter, the division of FRAC(N) by FRAC(D) from the subtraction of the exponent of D, EXP(D), from the exponent of N, EXP(N), were carried out in a conventional manner to obtain the result (R) as follows:

$R = 16^2 \times 0.A0000$

Because the bit trigger was not set, no adjustment to the result R of the division was required.

EXAMPLE 2

$N = 16^2 \times 0.C0000$ $D = 16^1 \times 0.60000$

Since FRAC(D) $\leq$ FRAC(N) < 4 $\times$ FRAC(D), it was necessary to reduce FRAC(N) by at least a factor of 4 and this was done by shifting FRAC(N) 2 bits to the right such that $N = 16^2 \times 0.30000$ The bit trigger was then set to indicate that FRAC(N) was shifted 2 bits to the right. Note that in this case EXP(N) was not adjusted. Thereafter, the division $N \div D$ was carried out in a normal manner to produce the result (R) as follows:

$R = 16^1 \times 0.80000$

However, because the bit trigger was set, after the result R was produced, it and its accompanying exponent EXP(R) had to be adjusted by shifting the fraction of R [FRAC(R)] two bits to the right and increasing EXP(R) by 1 to produce the following adjusted result:

Adj $R = 16^2 \times 0.20000$

EXAMPLE 3

$N = 16^2 \times 0.18000$ $D = 16^1 \times 0.60000$

Here, FRAC(N) < FRAC(D) and therefore no adjustments to FRAC(N) were required before the division operation was carried out to produce the result (R)

$R = 16^1 \times 0.30000$

To determine which one of the procedures described in examples 1–3 above applied, prior known methods and apparatus comprised means for performing the following comparison:

| | |
|---|---|
| N − D < 0 | Example 3 |
| N − 4 × D $\geq$ 0 | Example 1 |
| All Others | Example 2 |

The disadvantage of the above described prior known methods and apparatus was that the performance of the above described computations and comparisons to determine the relative magnitude of FRAC(N) and FRAC(D) and thereafter making the necessary adjustments was time consuming.

To avoid or at least minimize the time required to perform division operations as described above, it has also been a practice in the past to normalize the dividend N and divisor D and thereafter to simply shift FRAC(N) to the right by one digit (4 bits). This would insure that FRAC(N)<FRAC(D) whether or not an entire 4 bit right shift was actually required.

In a typical division operation which comprises dual iterative subtract and bit shifting operations, two quotient bits are produced each machine cycle. In such operations, if $N<D$, it is found that the dual iterative operations produce 4 leading logical zero quotient bits and that, if $D \leq N < 4 \times D$, the dual iterative operations produce 2 leading logical zero quotient bits. Since it takes one machine cycle to produce two quotient bits, the arbitrary right shifting of FRAC(N) described above to insure that FRAC(N)<FRAC(D) can result in from 1 to 2 wasted machine cycles when $D \leq N < 4 \times D$ and $N < D$, respectively.

SUMMARY OF THE INVENTION

In view of the foregoing, principal objects of the present invention are a method and apparatus for iteratively dividing a binary coded, hexidecimal dividend N having an exponential part EXP(N) and a fractional part FRAC(N), with a binary coded, hexidecimal divisor D having an exponential part EXP(D) and a fractional part FRAC(D).

In accordance with the above objects, FRAC(N) and FRAC(D) are initially normalized to eliminate leading zeros therefrom. Thereafter, their most significant digits, $N_0$ and $D_0$, respectively, are compared. If $N_0 < D_0$, FRAC(N) is transferred to a partial remainder register without being shifted. If $N_0 \geq 4 \times D_0$, FRAC(N) is transferred to the partial remainder register after being shifted 4 bit positions to the right. In all other cases, i.e. when $D_0 \leq N_0 < 4 \times D_0$, FRAC(N) is transferred to the partial remainder register after being shifted 2 bit positions to the right.

After FRAC(N) is selectively positioned in the partial remainder register as described above, FRAC(N) is transferred to a combinatorial logic circuit. In the logic circuit, FRAC(n) and FRAC(D) undergo an iterative division process wherein a pair of quotient bit is generated in each machine cycle by operations including a pair of bit shift and subtract operations. As the quotient bits are generated they are accumulated in an accumulation register.

The number of leading zero quotient bits which are generated in each machine cycle in the iterative division process as described above depends on the relative magnitude of $N_0$ and $D_0$. For example, if $D > N$ and the prior known practice of shifting FRAC(N) 4 bits to the right was used, 4 leading zero quotient bits would be generated and 2 additional machine cycles would be required. With the present invention, if $D > N$ and $D_0 > N_0$, the generation of the 4 leading quotient bits is eliminated and 2 machine cycles are saved. If $D_0 = N_0$, 2 of the leading zero quotient bits generated in prior art apparatus are eliminated and one of the 2 machine cycles required in prior art apparatus is saved. If $D \leq N < 4 \times D$ and the prior known practice of shifting FRAC(N) 4 bits to the right was used, 2 leading zero quotient bits would be generated and one additional machine cycle would be required. With the present invention, if $D \leq N < 4 \times D$ and $D_0 \leq N_0 < 4 \times D_0$, the generation of the 2 leading zero quotient bits is eliminated and the one machine cycle is saved. In other cases, the present invention generates the same number of leading zero quotient bits and uses the same number of machine cycles as was required using the prior known processes described above.

BRIEF DESCRIPTION OF THE DRAWING

The above and other objects, features and advantages of the present invention will become apparent from the following detailed description of the accompanying drawing, in which.

DETAILED DESCRIPTION OF THE DRAWING

Figure 1:
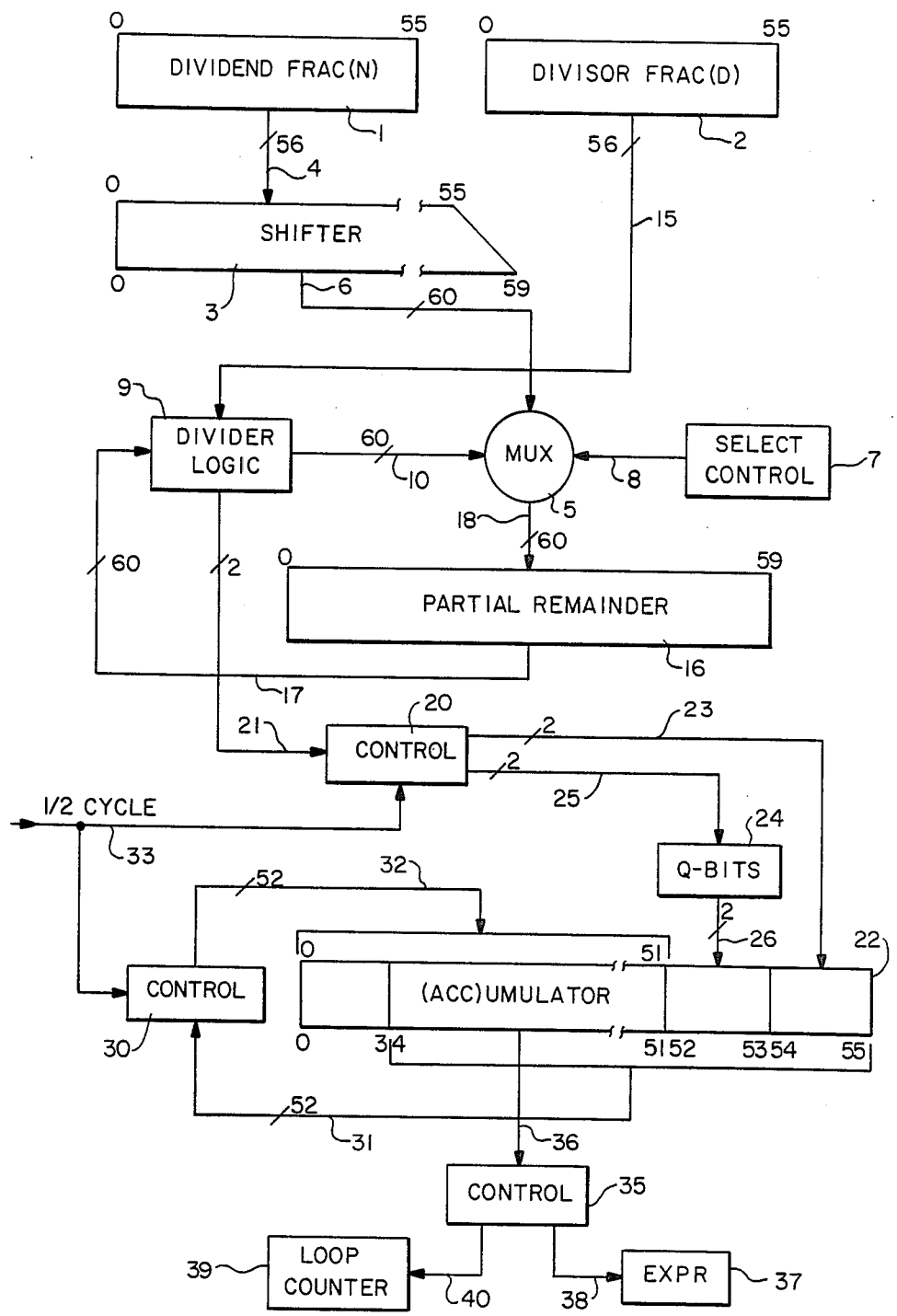
FIG. 1 is a block diagram of a typical apparatus used for performing an iterative division process.

Referring to FIG. 1 there is provided a typical iterative division apparatus a pair of 56-bit registers 1 and 2, respectively. The register 1 is coupled to a combinatorial shifter 3 by means of a 56-line bus 4. In the shifter 3 there is provided a plurality of gates for shifting the bits on the bus 4 four places to the right, i.e. from bit positions 0-55 to bit positions 4-59. The output of the shifter 3 is coupled to a multiplexer 5 by means of a 60-line bus 6. A select control circuit 7 is coupled to a control signal input of the multiplexer 5 by means of a control signal line 8. A second input of the multiplexer 5 is provided by a divider logic circuit 9 by means of a 60-line input bus 10. A first input of the divider logic circuit 9 is coupled to the register 2 by means of a 56-line bus 15. A second inut of the divider logic circuit 9 is coupled to the output of a 60-bit partial remainder register 16 by means of a 60-line bus 17. An output of the multiplexer 5 is coupled to an input of the register 16 by means of a 60-line bus 18.

An output of the divider logic circuit 9 is coupled to a quotient bits signal input of a control circuit 20 by means of a 2-line bus 21. A first output of the circuit 20 is coupled to bit positions 54 and 55 of a 56-bit accumulator register 22 by means of a bus 23. A second output of the circuit 20 is coupled to a Q-bits register 24 by means of a 2-line bus 25. The output of the Q-bits register 24 is coupled to bit positions 52 and 53 of the register 22 by means of a 2-line bus 26.

Bit positions 4-55 of the accumulator register 22 are coupled to a control circuit 30 by means of a 52-line bus 31. Outputs of the control circuit 30 are coupled to bit positions 0-51 of the accumulator register 22 by means of a 52-line bus 32. Control signals to the control circuits 20 and 30 are provided on a control signal bus 33.

A control circuit 35 is coupled to the accumulator register 22 by means of a control signal bus 36. A first output of the control circuit 35 is coupled to an exponential register (EXPR) 37 by means of a control signal line 38 and to a loop counter 39 by means of a control signal line 40.

Both the operation of the apparatus of FIG. 1 and the operation of the apparatus of the present invention, as will be described below, comprise an iterative division process comprising a pair of binary coded hexidecimal numbers (N) and (D) wherein N comprises the dividend and D comprises the divisor. In the dividend N and divisor D there is provided an exponential part EXP (N) and EXP (D), respectively, and a fractional part FRAC (N) and FRAC (D), respectively.

Figure 2:
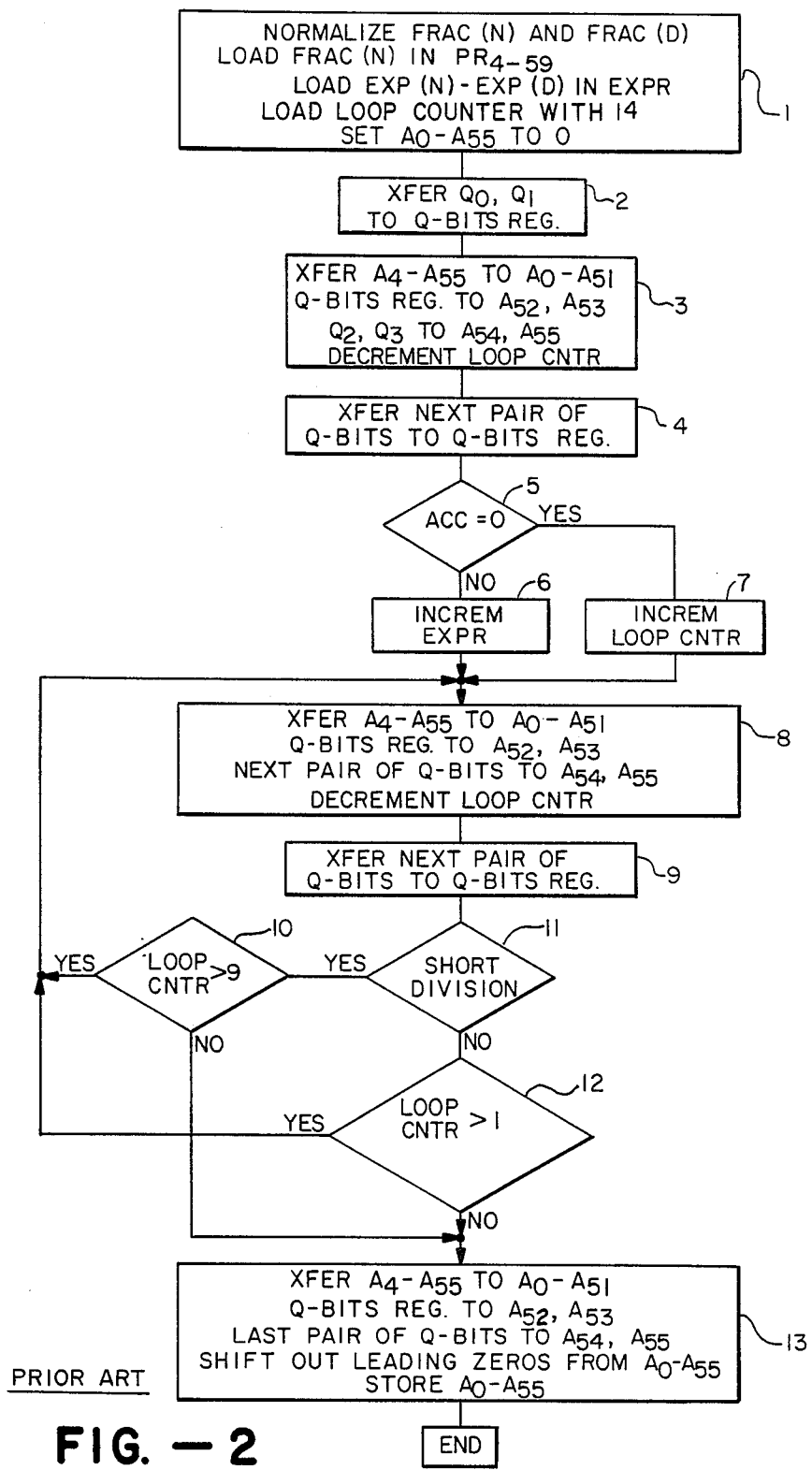
FIG. 2 is a flow diagram of a typical iterative division process used in the apparatus of FIG. 1.

Referring to FIG. 2, in the operation of the apparatus of FIG. 1, the apparatus was first initialized. In the initialization process, FRAC (N) and FRAC (D) were normalized, i.e. leading zeros in the most significant bit positions of FRAC (N) and FRAC (D) were eliminated by left shifts. For each left shift the associated exponential parts EXP (N) and EXP (D) was decremented. After FRAC (N) and FRAC (D) were normalized, FRAC (N) and FRAC (D) were loaded into the registers 1 and 2, respectively, the difference between the exponents EXP (N) and EXP (D), i.e. [EXP(N)−EXP(D)], was loaded into the exponential register 37, the loop counter 39 was loaded with 14 (see Block 1), and zeros were loaded into the accumulator 22. After the above-described operations were completed, FRAC(N) was transferred through the combinatorial shifter 3 and shifted 4 bit positions to the right with logical zeros being inserted in the most significant bit positions. From the shifter 3, FRAC(N) with four leading significant zeros was transferred into the partial remainder register 16.

In a first machine cycle following its transfer to the partial remainder register 16, FRAC(N) was transferred to the divider logic circuit 9. In the divider logic circuit 9, FRAC(N) and FRAC(D) underwent conventional iterative bit shift and subtract operations which produced a first pair of quotient bits $Q_0$ and $Q_1$ and a partial remainder. The bits $Q_0$ and $Q_1$ were transferred through the circuit 20 to the Q-bits register 24 and the partial remainder was transferred to the partial remainder register 16 (see Block 2).

At the beginning of the second machine cycle, bit positions $A_4$–$A_{55}$ in the accumulator register 22 were transferred to accumulator bit positions $A_0$–$A_{51}$. Thereafter, the contents of partial remainder register 16 was transferred to circuit 9, the contents of Q-bits register 24, now containing $Q_0$ and $Q_1$, were transferred to accumulator bit positions $A_{52}$–$A_{53}$, the next pair of quotient bits $Q_2$ and $Q_3$ were transferred through the control circuit 20 from the divider logic circuit 9 to accumulator bit positions $A_{54}$ and $A_{55}$, the partial remainder generated with $Q_2$ and $Q_3$ was transferred to register 16 and the loop counter 39 was decremented (see Block 3).

During the third machine cycle circuit 9 was again used as described above and the next pair of quotient bits $Q_4$ and $Q_5$ were transferred to the Q-bits register 24 (see Block 4). Thereafter, the accumulator register 22 was tested to determine whether or not it contained all zeros (see Block 5). If it did not contain all zeros, the exponential register EXPR 37 was incremented by the control circuit 35 (see Block 6). If the accumulator register 22 did contain all zeros, the loop counter 39 was incremented by the control circuit 35 adding two machine cycles to the iterative division process (see Block 7).

In the fourth and subsequent machine cycles, the operations described above with respect to the second and first machine cycles were performed alternately, beginning with the operations described with respect to the second machine cycle (see Blocks 8 and 9).

After the generation of each pair of quotient bits transferred to the Q-bits register 24, the contents of the loop counter were checked. If the contents of the loop counter 39 exceeded 9 for short division or 1 for long division, the division process was continued until either of the above conditions no longer existed, at which time the last pair of quotient bits generated in the division process was transferred to bit positions $A_{54}$ and $A_{55}$ of the accumulator register (see Blocks 10–13). Thereafter, the leading zero digits were shifted out of the quotient stored in the accumulator register 22 and bit positions $A_0$–$A_{55}$ were stored for subsequent use.

Figure 3:
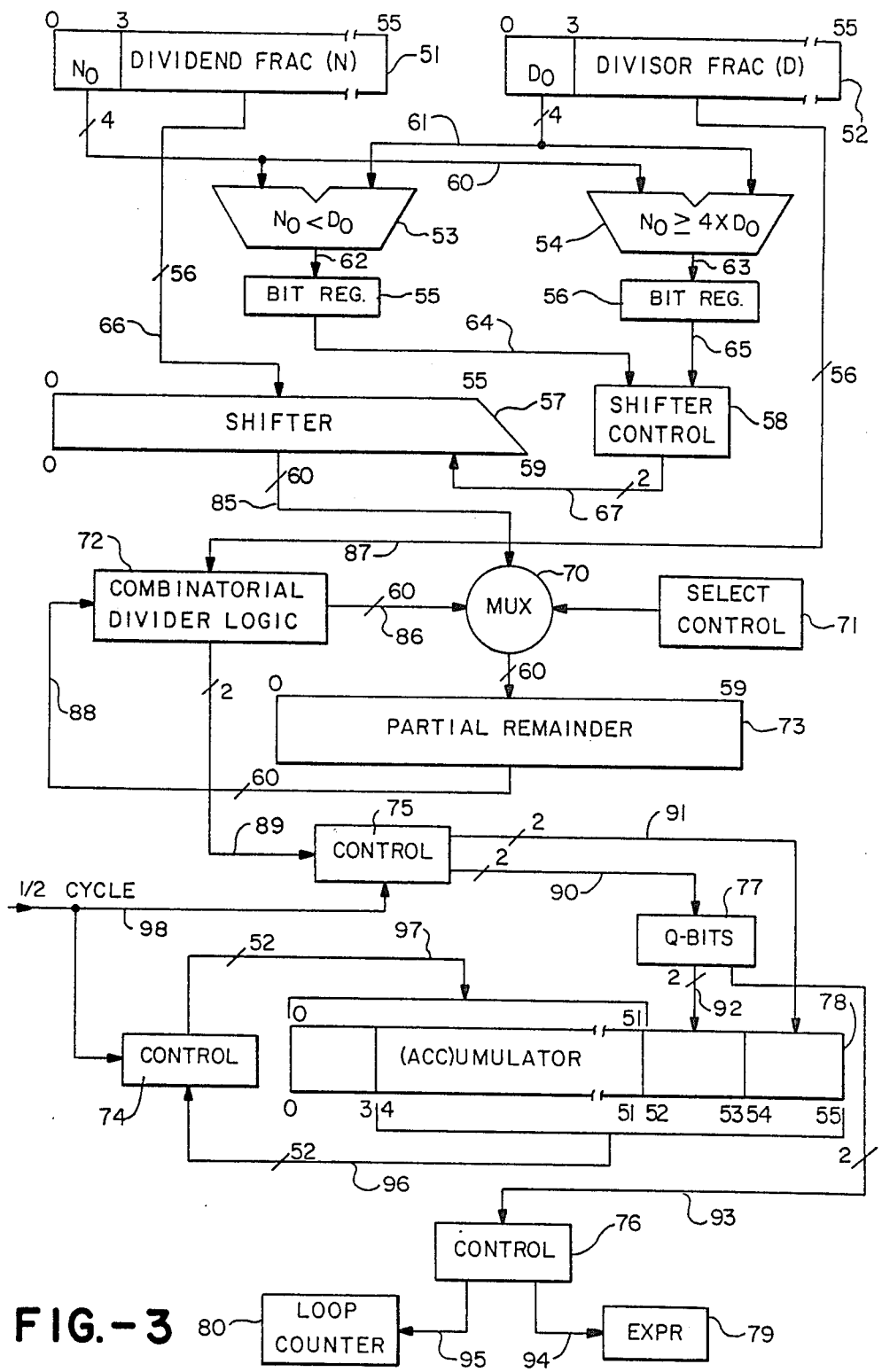
FIG. 3 is a block diagram of a division apparatus according to the present invention.

Referring to FIG. 3, there is provided in accordance with the present invention a pair of 56-bit registers 51 and 52, a pair of comparators 53 and 54, a pair of bit registers 55 and 56, a combinatorial shifter circuit 57 and a shifter control circuit 58.

A first input of the comparators 53 and 54 is coupled to bit positions 0–3 of the register 51 by means of a 4-line bus 60. A second input of the comparators 53 and 54 is coupled to bit positions 0–3 of the register 52 by means of a 4-line bus 61. An output of the comparator 53 is coupled to an input of the bit register 55 by means of a line 62. An output of the comparator 54 is coupled to an input of the bit register 56 by means of a line 63. A first input of the shifter control circuit 58 is coupled to an output of the bit register 55 by means of a line 64. A second input of the shifter control circuit 58 is coupled to an output of the bit register 56 by means of a line 65. Bit positions 0–55 of the register 51 are coupled to corresponding inputs of the shifter 57 by means of a 56-line bus 66. An output of the shifter control circuit 58 is coupled to a control signal input of the shifter 57 by means of a control signal line 67.

Shown below the shifter 57 there is provided a multiplexer 70, a multiplexer select control circuit 71, a combinatorial divider logic circuit 72, a 60-bit partial remainder register 73, a first, second and third control circuit 74, 75 and 76, respectively, a Q bits register 77, a 56-bit accumulator register 78, an exponential result register 79 and a loop counter 80.

A first input of the multiplexer 70 is coupled to bit positions 0–59 of the shifter 57 by means of a 60-line bus 85. A second input of the multiplexer 70 is coupled to an output of the combinatorial logic circuit 72 by means of a 60-line bus 86. A first input of the logic circuit 72 is coupled to bit positions 0–55 of the register 52 by means of a 56-line bus 87. A second input of the logic circuit 72 is coupled to bit positions 0–59 of the partial remainder register 73 by means of a 60-line bus 88. A second output of the logic circuit 72 is coupled to the control circuit 75 by means of a 2-line bus 89. A first output of the control circuit 75 is coupled to an input of the Q-bits register 77 by means of a 2-line bus 90. A second output of the control circuit 75 is coupled to bit positions 54 and 55 of the accumulator register 78 by means of a 2-line bus 91. A first output of the Q-bits register 77 is coupled to bit positions 52 and 53 of the accumulator register 78 by means of a 2-line bus 92. A second output of the Q-bits register 77 is coupled to an input of the control circuit 76 by means of a control bus 93. A first output of the control circuit 76 is coupled to the exponential result register 79 by means of a bus 94. A second output of the control circuit 76 is coupled to an input of the loop counter 80 by means of a bus 95. Bit positions 4–55 of the accumulator register 78 are coupled to a first input of the control circuit 74 by means of a 52-line bus 96. An output of the control circuit 74 is coupled to bit positions 0–51 of the accumulator register 78 by means of a 52-line bus 97. Control signals to the control circuits 74 and 75 are provided on a control signal bus 98.

Figure 4:
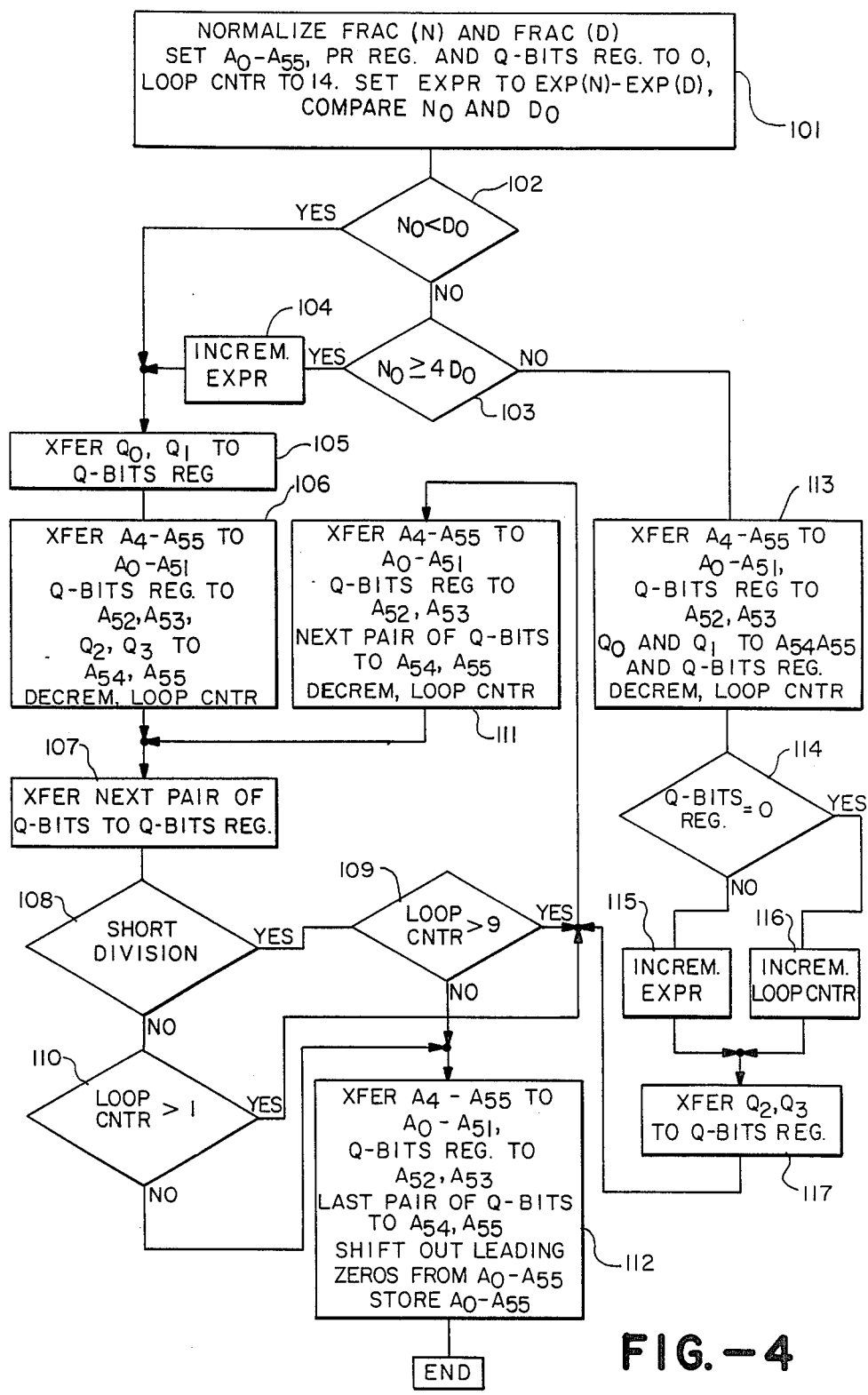
FIG. 4 is a flow diagram of a process which uses the apparatus of FIG. 3 according to the present invention.

Referring to FIG. 4, in the operation of the apparatus of FIG. 3 the apparatus is first initialized. In the initialization process, FRAC(N) and FRAC(D) are normalized, i.e. leading zeros in the most significant bit positions of FRAC(N) and FRAC(D) are eliminated by left shifts. For each left shift, the associated exponential parts EXP(N) and EXP(D) are decremented. After FRAC(N) and FRAC(D) are normalized, FRAC(N) and FRAC(D) are loaded into the registers 51 and 52, respectively. The difference between the exponents EXP(N) and EXP(D), i.e. [EXP(N)−EXP(D)], is loaded into the exponential register 79, the loop counter 80 is loaded with 14 (see Block 101), and zeros are loaded into the accumulator 78 and Q-bits register 77. After the above-described operations are completed, all of the bits 0–55 of FRAC(N) are transferred to the shifter 57 and the most significant digits $N_0$ and $D_0$ of FRAC(N) and FRAC(D), respectively, i.e. bit positions 0–3, are compared in comparators 53 and 54.

In comparator 53 a comparison is made to determine whether or not $N_0$ is less than $D_0$. If it is, bit register 55 is set. In comparator 54 a comparison is made to determine whether or not $N_0$ is greater than or equal to $4 \times D_0$. If it is, bit register 56 is set.

Shifter control circuit 58 is responsive to the condition of the bit registers 55 and 56 for controlling the shifter 57. If bit register 55 is set, shifter control circuit 58 causes the shifter 57 to transfer FRAC(N) to the multiplexer 70 without any shifts. If bit register 56 is set, shifter control circuit 58 causes the shifter 57 to shift FRAC(N) four bit positions to the right, inserting zeros in the most significant bit positions thereof. In all other cases, i.e. when bit registers 55 and 56 are reset to zero, shifter control circuit 58 causes shifter 57 to shift FRAC(N) two bit positions to the right, inserting zeros in the most significant bit positions thereof. Also, if bit register 56 is set, exponential result register 79 is incremented by the control circuit 76 (see Blocks 102, 103, 104).

From the shifter 57, FRAC(N) is transferred to the partial remainder register 73 through the multiplexer 70 under the control of the select control circuit 71. In a first machine cycle following its transfer to the partial remainder register 73, FRAC(N) is transferred to the divider logic circuit 72. In the divider logic circuit 72, FRAC(N) and FRAC(D) undergo conventional iterative bit shift and subtract operations which produce a first pair of quotient bits $Q_0$ and $Q_1$ and a partial remainder. The quotient bits $Q_0$ and $Q_1$ are transferred through the circuit 75 to the Q-bits register 77 and the partial remainder is transferred to the partial remainder register 73 (see Block 105).

At the beginning of the second machine cycle, bit positions $A_4$–$A_{55}$ in the accumulator register 78 are transferred to accumulator bit positions $A_0$–$A_{51}$. Thereafter, the contents of partial remainder register 73 are transferred to logic circuit 72, the contents of Q-bits register 77, now containing $Q_0$ and $Q_1$, are transferred to accumulator bit positions $A_{52}$–$A_{53}$, the next pair of quotient bits $Q_2$ and $Q_3$ are transferred through the control circuit 75 from the divider logic circuit 9 to accumulator bit positions $A_{54}$ and $A_{55}$, the partial remainder generated with $Q_2$ and $Q_3$ is transferred to the partial remainder register 73 and the loop counter 80 is decremented (see Block 106).

During the third machine cycle, logic circuit 72 is again used as described above and the next pair of quotient bits $Q_4$ and $Q_5$ are transferred to the Q-bits register 77 (see Block 107).

After the quotient bits are transferred to the Q-bits register, the loop counter is checked. If the loop counter exceeds 9 during a short division or exceeds 1 during a long division, the above-described division process continues. In the fourth and subsequent machine cycles, the operations described above with respect to the second and first machine cycles are performed alternately, beginning with the operations described with respect to the second machine cycle (see Blocks 108–111). When the loop counter 80 no longer exceeds 9 in a short division nor exceeds 1 in a long division, the last pair of quotient bits is generated in the divider logic circuit 72 and transferred to bit positions 54 and 55 of the accumulator register 78 (see Block 112). Thereafter, the leading zeros are shifted out of the quotient stored in the accumulator register 78 and bit positions $A_0$–$A_{55}$ are stored for subsequent use.

If in comparing the relative magnitudes of the digits $N_0$ and $D_0$ it is found that $N_0$ is neither less than $D_0$ nor greater than or equal to $4 \times D_0$, the initial machine cycles are changed from that described above. Following initialization of the apparatus, bit positions $A_4$–$A_{55}$ in the accumulator register 78 are transferred to accumulator bit position $A_0$–$A_{51}$, the contents of the Q-bits register 77 are transferred to bit positions $A_{52}$ and $A_{53}$ of the accumulator register 78 and the first pair of quotient bits $Q_0$ and $Q_1$ are transferred to bit positions $A_{54}$ and $A_{55}$ of the accumulator register 78 as well as to the Q-bits register 77 and the loop counter 80 is decremented (see Block 113). Thereafter, the Q-bits register 77 is checked to determine whether the contents therein equal zero (see Block 114). If the contents do not equal zero, the exponential result register 79 is incremented (see Block 115). If the contents do equal zero, the loop counter 80 is incremented (see Block 116). The incrementing of the loop counter 80 adds two cycles to the division process.

After either the exponential result register 79 or the loop counter 80 is incremented, the apparatus enters its next machine cycle, in which the next pair of quotient bits $Q_2$ and $Q_3$ are transferred to the Q-bits register 77 (see Block 117). At the transfer of $Q_2$ and $Q_3$ to the Q-bits register 77, the operations described above with respect to Block 111 are executed followed by the operations described above with respect to Blocks 107–112.

While a preferred embodiment of the present invention is described in which one or two machine cycles are saved during an iterative division process of a pair of binary coded, hexidecimal numbers, it is contemplated that various modifications may be made to the method and apparatus described without departing from the spirit and scope of the present invention. Accordingly, it is intended that the above description be considered only as illustrative of the present invention and that the scope thereof be determined by reference to the claims hereinafter provided.

What is claimed is:

1. A method of dividing a pair of binary coded hexidecimal floating point numbers including a dividend N and a divisor D wherein said N includes an exponential part EXP(N) and a fractional part FRAC(N), said FRAC(N) including a most significant digit ($N_0$) and said D includes an exponential part EXP(D) and a fractional part FRAC(D), said FRAC(D) including a most significant digit ($D_0$), comprising in sequence the steps of:

normalizing said FRAC(N) and said FRAC(D);
comparing said $N_0$ and said $D_0$;
transferring said FRAC(N) to a partial remainder register without shifting said FRAC(N) when said $N_0 < D_0$;
shifting said FRAC(N) four bits to the right and transferring said shifted FRAC(N) to said partial remainder register when said $N_0 \geq 4 \times D_0$;

shifting said FRAC(N) two bits to the right and transferring said shifted FRAC(N) to said partial remainder register when said $D_0 \leq N_0 < 4 \times D_0$;

dividing the contents of said partial remainder register by said FRAC(D) in a predetermined number of machine cycles, each of said machine cycles producing a pair of quotient bits; and accumulating said quotient bits in an accumulating register.

2. A method according to claim 1 wherein said dividing and accumulating steps comprise the steps of:

transferring a first and succeeding alternate pairs of said quotient bits in a Q-bits register during a first and succeeding alternate machine cycles; and transferring the contents of said Q-bits register and a second and succeeding alternate pairs of said quotient bits to said accumulating register during a second and succeeding alternate machine cycles, each of said second and succeeding alternate machine cycles following one of said first and succeeding alternate machine cycles.

3. A method according to claim 2 wherein said dividing and accumulating steps comprise the steps of transferring the contents of bit positions 4 to M+4 in said accumulating register to bit positions 0 to M in said accumulating register at the beginning of said second and succeeding alternate machine cycles, said M comprising a predetermined number of bits.

4. A method according to claim 2 wherein said dividing and accumulating steps comprise the steps of:

storing the remainder of the subtraction EXP(N)−EXP(D) in an exponent result register EXP(R); and increasing the contents of said exponent register EXP(R) when $N_0 \geq 4 \times D_0$.

5. A method according to claim 2 wherein said dividing and accumulating steps comprise the step of:

selectively increasing the number of machine cycles required for dividing said FRAC(N) by said FRAC(D) when $D_0 \leq N_0 < 4 \times D_0$ and said first pair of quotient bits are 0;

storing the remainder of the subtraction EXP(N)−EXP(D) in an exponent result register EXP(R); and increasing the contents of said exponent register EXP(R) when $D_0 \leq N_0 < 4 \times D_0$ and said first pair of quotient bits are not 0.

6. An apparatus for dividing a pair of binary coded hexidecimal floating point numbers including a dividend N and a divisor D wherein said N includes an exponential part EXP(N) and a fractional part FRAC(N), said FRAC(N) including a most significant digit ($N_0$) and said D includes an exponential part EXP(D) and a fractional part FRAC(D), said FRAC(D) including a most significant digit ($D_0$), comprising:

a partial remainder register;
an accumulating register;

means for normalizing said FRAC(N) and said FRAC(D);

means for comparing said $N_0$ and said $D_0$;

means for transferring said FRAC(N) to said partial remainder register, including shifter means for shifting said FRAC(N), and means coupled to said comparing means for transferring said FRAC(D) without shift when said $N_0 < D_0$, and providing said FRAC(D) transferred a shift of two bit to the right when said $D_0 \leq N_0 < 4 \times D_0$ and a shift of four bit to the right of when said $N_0 \geq 4 \times D_0$;

means for dividing the contents of said partial remainder register by said FRAC(D) in a predetermined number of machine cycles, each of said machine cycles producing a pair of quotient bits; and means for accumulating said quotient bits to said accumulating register.

7. An apparatus according to claim 6 comprising a Q-bits register and wherein said dividing and accumulating means comprise:

means for transferring a first and succeeding alternate pairs of said quotient bits to said Q-bits register during a first and succeeding alternate machine cycles; and means for transferring the contents of said Q-bits register and a second and succeeding alternate pairs of said quotient bits to said accumulating register during a second and succeeding alternate machine cycles, each of said second and succeeding alternate machine cycles following one of said first and succeeding alternate machine cycles.

8. An apparatus according to claim 7 wherein said dividing and accumulating means comprise means for transferring the contents of bit positions 4 to M+4 in said accumulating register to bit positions 0 to M in said accumulating register at the beginning of said second and succeeding alternate machine cycles, said M comprising a predetermined number of bits.

9. An apparatus according to claim 7 comprising an exponent result register EXP(R) and wherein said dividing and accumulating means comprise:

means for storing the remainder of the subtraction EXP(N)−EXP(D) in said exponent result register EXP(R); and means for increasing the contents of said exponent register EXP(R) when $N_0 \geq 4 \times D_0$.

10. An apparatus according to claim 7 comprising an exponent result register EXP(R) and wherein said dividing and accumulating means comprise:

means for selectively increasing the number of machine cycles required for dividing said FRAC(N) by said FRAC(D) when $D_0 \leq N_0 < 4 \times D_0$ and said first pair of quotient bits are 0;

means for storing the remainder of the subtraction EXP(N)−EXP(D) in said exponent result register EXP(R); and means for increasing the contents of said exponent register EXP(R) when $D_0 \leq N_0 < 4 \times D_0$ and said first pair of quotient bits are not 0.

* * * * *